United States Patent
Eser et al.

(10) Patent No.: US 10,883,440 B2
(45) Date of Patent: *Jan. 5, 2021

(54) METHOD AND DEVICE FOR OPERATING AN INTERNAL COMBUSTION ENGINE

(71) Applicant: CPT Group GmbH, Hannover (DE)

(72) Inventors: Gerhard Eser, Hemau (DE); Hong Zhang, Tegernheim (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/340,123

(22) PCT Filed: Sep. 18, 2017

(86) PCT No.: PCT/EP2017/073507
§ 371 (c)(1),
(2) Date: Apr. 7, 2019

(87) PCT Pub. No.: WO2018/068996
PCT Pub. Date: Apr. 19, 2018

(65) Prior Publication Data
US 2020/0011262 A1   Jan. 9, 2020

(30) Foreign Application Priority Data
Oct. 10, 2016   (DE) .................. 10 2016 219 572

(51) Int. Cl.
*F02D 41/38*  (2006.01)
*F02D 41/40*  (2006.01)
*F02D 41/14*  (2006.01)

(52) U.S. Cl.
CPC ....... *F02D 41/3809* (2013.01); *F02D 41/401* (2013.01); *F02D 41/1441* (2013.01);
(Continued)

(58) Field of Classification Search
CPC ............... F02D 41/3809; F02D 41/401; F02D 41/1441; F02D 2200/0602; F02D 2200/0616; F02D 2200/1004
(Continued)

(56) References Cited

U.S. PATENT DOCUMENTS

| 5,226,390 A | * | 7/1993 | Nakagawa ............ F02D 35/023 |
| | | | 123/436 |
| 7,031,820 B2 | | 4/2006 | Ueda et al. ................... 701/101 |

(Continued)

FOREIGN PATENT DOCUMENTS

| DE | 10 2004 044 808 A1 | 4/2006 | ............. F02D 41/00 |
| DE | 60117090 T2 | 11/2006 | ............. F02D 21/08 |

(Continued)

OTHER PUBLICATIONS

German Office Action, Application No. 10 2016 219 572.7, 5 pages, dated Apr. 12, 2017.

(Continued)

*Primary Examiner* — Mahmoud Gimie
(74) *Attorney, Agent, or Firm* — Slayden Grubert Beard PLLC

(57) ABSTRACT

Various embodiments include a method comprising: determining a torque output of each cylinder resulting from a fuel injection into the cylinder; determining a difference in the respective torque; comparing the difference in the respective torque output with a threshold; if the difference exceeds the threshold, changing the injection mass for at least one cylinder based on the difference; determining a further torque output of the cylinder resulting from the injection of the changed injection mass; determining whether the further torque output corresponds to the changed injection mass; if the further torque output lies outside a predetermined tolerance range for a corresponding injection mass, setting the (Continued)

injection mass to be injected to the original value; and changing the injection time in at least the one of the at least two cylinders.

8 Claims, 3 Drawing Sheets

(52) U.S. Cl.
  CPC ............... *F02D 2200/0602* (2013.01); *F02D 2200/0616* (2013.01); *F02D 2200/1004* (2013.01)

(58) Field of Classification Search
  USPC .......................................................... 123/478
  See application file for complete search history.

(56) References Cited

U.S. PATENT DOCUMENTS

| | | | | |
|---|---|---|---|---|
| 7,178,507 | B1 | 2/2007 | Gangopadhyay | 123/435 |
| 7,480,557 | B2* | 1/2009 | Yamaguchi | F02D 35/023 123/299 |
| 7,899,603 | B2* | 3/2011 | Yamamoto | F02D 41/3076 701/104 |
| 7,921,700 | B2 | 4/2011 | Raichle et al. | 73/114.27 |
| 2002/0112528 | A1 | 8/2002 | Antonioli et al. | 73/49.7 |
| 2007/0266993 | A1 | 11/2007 | Kettl et al. | 123/406.24 |
| 2008/0276904 | A1* | 11/2008 | Surnilla | F02P 5/1522 123/406.45 |
| 2010/0050755 | A1 | 3/2010 | Kappelmann et al. | 73/114.45 |
| 2010/0242581 | A1* | 9/2010 | Morikawa | F02D 41/401 73/114.49 |
| 2011/0224888 | A1 | 9/2011 | Girotto et al. | 701/103 |
| 2012/0204830 | A1 | 8/2012 | Gottschalk et al. | 123/294 |
| 2012/0255531 | A1 | 10/2012 | Kinose | 123/673 |
| 2012/0297866 | A1 | 11/2012 | Tanaka et al. | 73/114.31 |
| 2015/0051813 | A1* | 2/2015 | Ramundo | F02D 41/3005 701/104 |
| 2015/0053184 | A1* | 2/2015 | Ruth | F02M 63/0225 123/478 |
| 2016/0333809 | A1* | 11/2016 | Jammoussi | F02D 41/1497 |
| 2017/0314498 | A1* | 11/2017 | Pathan | F02D 41/0235 |

FOREIGN PATENT DOCUMENTS

| | | | | |
|---|---|---|---|---|
| DE | 102006023473 B3 | 5/2007 | | F02D 41/14 |
| DE | 10 2006 046 840 A1 | 4/2008 | | F02D 41/22 |
| DE | 11 2006 003 029 B4 | 10/2008 | | F02M 7/00 |
| DE | 10 2007 024 416 A1 | 11/2008 | | F02D 41/00 |
| DE | 10 2007 044 614 B3 | 4/2009 | | F02D 41/00 |
| DE | 102008017163 B3 | 11/2009 | | F02D 41/00 |
| DE | 10 2011 011 337 B3 | 2/2012 | | F02D 41/00 |
| DE | 10 2013 222 547 A1 | 5/2015 | | F02D 41/30 |
| DE | 102013224706 A1 | 6/2015 | | F02D 41/40 |
| JP | 2005127304 A | 5/2005 | | F02D 13/02 |
| JP | 2008138681 A | 6/2008 | | F02D 45/00 |
| WO | 2014/065743 A1 | 5/2014 | | F02D 41/22 |
| WO | 2018/068996 A1 | 4/2018 | | F02D 41/00 |

OTHER PUBLICATIONS

International Search Report and Written Opinion, Application No. PCT/EP2017/073507, 24 pages, dated Jan. 2, 2018.

Korean Office Action, Application No. 2019-7013241, 5 pages, dated Mar. 30, 2020.

Korean Notice of Allowance, Application No. 2020049600838, 3 pages, dated Jul. 21, 2020.

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2017/073507 filed Sep. 18, 2017, which designates the United States of America, and claims priority to DE Application No. 10 2016 219 572.7 filed Oct. 10 18, 2016, the contents of which are hereby incorporated by reference in their entirety.

TECHNICAL FIELD

The present disclosure relates to internal combustion engines. Various embodiments include method and/or devices for operating an internal combustion engine.

BACKGROUND

In motor vehicles having a so-called common rail injection system (also referred to as accumulator injection system), a plurality of, typically all, injectors are coupled to a common fuel distributor (common rail) which is under a high pressure. The amount of fuel to be injected into the cylinders of the internal combustion engine in each case within a cylinder cycle, also referred to as operating cycle, is typically primarily metered by virtue of the fact that the respective injector is actuated with an actuating period, which is selected to be shorter or longer, in order to inject fuel into the respective cylinder. The injector is in each case opened during the actuating period.

By virtue of manufacturing tolerances and aging phenomena in the injection system, the injection masses can vary between the individual cylinders. This can lead to torque differences between the cylinders, which can have a negative effect on the running smoothness or the emission behavior of the internal combustion engine. Thus, particularly wear phenomena or deposits can lead to a situation in which an actual opening period or an actual degree of opening of the injector for a given fuel pressure and a given actuating period is changed during a service life of the injectors.

SUMMARY

The present disclosure describes methods and corresponding devices for operating an internal combustion engine that allows reliable operation of the internal combustion engine having at least two cylinders. For example, some embodiments include a method for operating an internal combustion engine (106) having at least two cylinders (102, 103, 104, 105) for a motor vehicle, comprising: determining a respective torque output of the cylinders (102, 103, 104, 105), which occurs in each case due to an injection of fuel into the respective cylinder (102, 103, 104, 105), determining a difference in the torque outputs, comparing the difference in the torque outputs with a predetermined threshold value for the torque output, and, if the determined difference exceeds the threshold value, changing the injection mass for at least one of the cylinders (102) in dependence on the determined difference in the torque outputs, determining a further torque output of the at least one of the cylinders (102), which occurs due to the injection of the changed injection mass, determining whether the further torque output corresponds to the changed injection mass, and, if the further torque output lies outside a predetermined tolerance range for a corresponding injection mass, setting the injection mass to be injected to the original value, and changing the injection time at least in the one of the cylinders (102).

In some embodiments, the method further comprises: determining a respective crankshaft acceleration of a crankshaft (107) of the internal combustion engine (106), wherein the crankshaft acceleration occurs in each case due to an injection of fuel into the respective cylinder (102, 103, 104, 105), and determining the respective torque output in dependence on the respective crankshaft acceleration.

In some embodiments, the crankshaft acceleration is determined by means of a transmitter wheel sensor and of a transmitter wheel which is coupled to the crankshaft (107).

In some embodiments, the crankshaft acceleration is determined in dependence on a running smoothness of the internal combustion engine (106).

In some embodiments, the crankshaft acceleration is determined in dependence on a change in rotational speed of the crankshaft (107).

In some embodiments, the method further comprises repeating the method steps until a further determined difference in the torque outputs is less than the predetermined threshold value for the torque output.

In some embodiments, the method further comprises determining another defect if, after a predetermined time interval, the further determined difference is not less than the predetermined threshold value for the torque output.

As another example, some embodiments include a device which is designed to carry out a method as described above.

BRIEF DESCRIPTION OF THE DRAWINGS

Further advantages, features, and developments can be gathered from the following examples which are explained in conjunction with the figures, in which.

DETAILED DESCRIPTION

Figure 1:
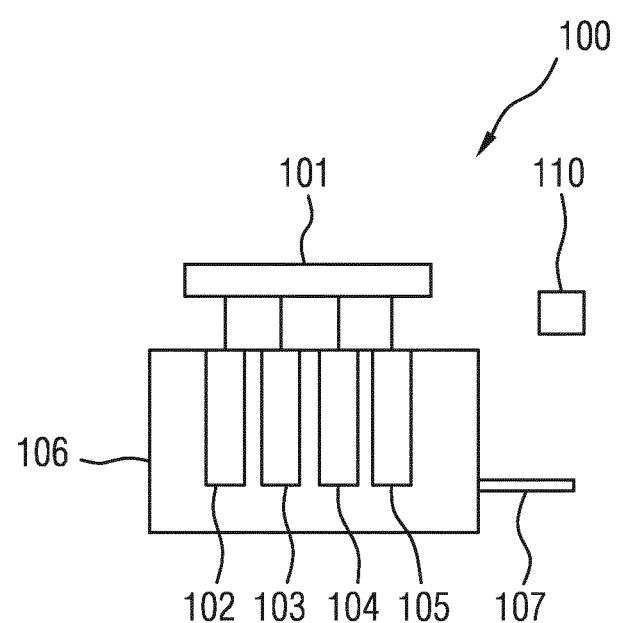
FIG. 1 shows a schematic illustration of a system having an internal combustion engine incorporating teachings of the present disclosure.

In some embodiments, a respective torque output of the cylinders is determined. The torque output occurs due to an injection of fuel into the respective cylinder. A difference in the torque outputs is determined. The determined difference is compared with a predetermined threshold value for the torque output. If the determined difference exceeds the threshold value, the injection mass for at least one of the cylinders is changed in dependence on the determined difference of the torque outputs. A further torque output of the at least one cylinder that occurs due to the injection of the changed injection mass is determined. It is subsequently determined whether the further torque output corresponds to the change in the injection mass. If the further torque output lies outside a predetermined tolerance range for a corresponding injection mass, the injection mass to be injected is set to the original value and the injection time at least in the one of the cylinders is changed.

The injection mass, that is to say the mass of fuel which is in each case injected into the cylinder in order to generate a torque on a crankshaft of the internal combustion engine, is normally in a linear relationship with the torque resulting from the injection mass. The injected amount of fuel therefore normally predetermines the power output of the respective cylinder. The injected amount is thus conventionally proportional to the torque of the crankshaft. The method according to the application allows a conclusion to be drawn as to whether different torque outputs of the cylinders occur due to different injection masses, or whether an injection time of the injection is a cause for the different torque output.

If the expected linear relationship between injection mass and torque is not established after a change in the injection mass, the injection mass change is reversed. If an increase in the injection mass is not followed by a corresponding increase in the torque, the injection mass change is reversed. If a reduction in the injection mass is not followed by a corresponding reduction in the torque, the injection mass change is reversed. The injection time of the injection, also termed phase position of the injection, is subsequently adapted. The injection time in each case relates to the cylinder cycle of the respective cylinders, also termed operating cycle. For example, the time period of the cylinder cycle begins at the top dead center prior to intake and ends at the top dead center after the ejection of the combustion gases.

In some embodiments, the methods match the torque output of the individual cylinders of the internal combustion engine on the basis of an adaptation of the injection time. By virtue of the additional adaptation of the injection time, it is possible to avoid defective trimming of the cylinder equalization. It can be established whether a deviation in the torque output in fact occurs due to different injection masses or due to an incorrect injection time. Thus, inaccurate error diagnoses can also be alleviated.

In the case of diesel internal combustion engines, the fuel is injected into the hot, compressed air in the cylinder. The combustion is then initiated by the self-ignition resulting from the cylinder temperature which increases due to the compression. The time between beginning of injection and the beginning of the combustion is termed ignition delay. The chemical ignition delay time greatly depends on the vaporization of the mixture and thus on pressure and temperature. The change in rotational speed then in turn depends on the cylinder pressure and the mass forces.

The highest compression temperature is established shortly before the top dead center. If a combustion is initiated too early by a too early injection, the combustion pressure rises sharply and counteracts the piston movement in the cylinder. The amount of heat released in the process impairs the efficiency of the engine. Consequently, a time-advanced beginning of combustion causes an increased temperature in the cylinder.

A too late injection time can, under low load, lead to an incomplete combustion. This means that the values for hydrocarbons and carbon monoxide in the emission increase since the temperatures in the combustion chamber already begin to fall again. The combustion chamber temperature can be determined, for example, by means of an exhaust gas temperature sensor.

In some embodiments, the respective crankshaft acceleration, for example, is determined by means of a transmitter wheel sensor and of a transmitter wheel which is coupled to the crankshaft. The transmitter wheel is, for example, a toothed wheel, and the transmitter wheel sensor is, for example, a Hall sensor. It is thus possible to evaluate tooth times in order to determine the crankshaft acceleration. In some embodiments, the crankshaft acceleration is determined in dependence on a running smoothness of the internal combustion engine. In some embodiments, the crankshaft acceleration is determined in dependence on a change in rotational speed of the crankshaft.

In some embodiments, the method steps described are at least partially repeated until a further determined difference in the torque outputs is less than the predetermined threshold value for the torque output. In some embodiments, another defect is determined if, after a predetermined time interval, the further determined difference is not less than the predetermined threshold value for the torque output. If the method according to the application, even after being repeatedly carried out after the predetermined time interval, does not result in the torque outputs being matched, another defect is present as a cause for the torque deviation, this defect not occurring due to the injection masses or the injection time. The other defect is, for example, a defect in the exhaust gas recirculation or a defect in the compression.

FIG. 1 shows a system 100 having an internal combustion engine 106 and a fuel distributor 101 (also termed common rail). Fuel from a fuel tank (not shown) is collected under high pressure in the fuel distributor 101 and subsequently injected directly into cylinders 102, 103, 104 and 105 of the internal combustion engine 106. The combustion of the injected fuel leads to a torque output of the cylinders 102 to 105 to a crankshaft 107 of the internal combustion engine 106. In the illustrated embodiment, the internal combustion engine 106 has four cylinders 102 to 105. In some embodiments, the internal combustion engine has more than four or fewer than four cylinders. The cylinders 102 to 105 can also be referred to as combustion chambers of the internal combustion engine 106.

On account of manufacturing tolerances in the system 100 and through the occurrence of aging phenomena, the actually injected fuel masses can vary between the individual cylinders 102 to 105. For example, the amount of fuel which is actually injected per injector with the actuating period remaining the same varies. These differences between the injection masses of the respective cylinders 102 to 105 lead to different torque outputs of the cylinders 102 to 105 to the crankshaft 107. These torque differences can have a negative effect on the running smoothness or the emission behavior of the internal combustion engine.

A device 110, which is, for example, part of an engine controller, is configured to carry out a method explained below in conjunction with FIG. 2 in order to correct the different torque outputs, with the result that the respective torque outputs of the cylinders 102 to 105 lie within a predetermined tolerance range.

Figure 2:
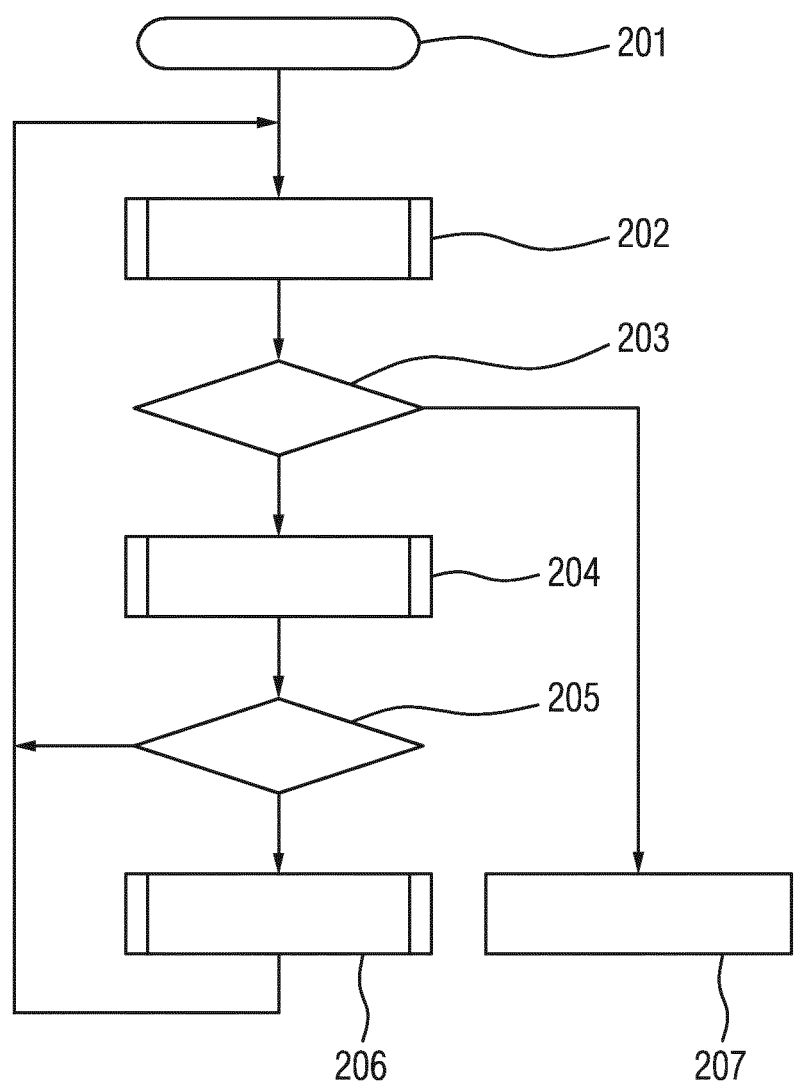
FIG. 2 shows a schematic illustration of a flow diagram of a method incorporating teachings of the present disclosure.

The method according to FIG. 2 is started in step 201. Subsequently, in step 202, the torque output of the cylinder 102 is compared with the torque output of the cylinder 103 and with the torque output of the cylinder 104 and with the torque output of the cylinder 105. For this purpose, for example, the crankshaft acceleration per cylinder cycle of the cylinders 102 to 105 is compared. In some embodiments, a difference in the crankshaft accelerations is determined in order to draw a conclusion on the variations in the crankshaft acceleration. In some embodiments, other combinations of the cylinders 102 to 105 are used for the comparison.

It is subsequently determined in step 203 whether a deviation in the respective torque outputs of the cylinders 102 to 105 is greater than a predetermined threshold value. For example, a comparison is made as to whether the difference between the torque outputs is greater than the predetermined threshold value. If the difference is less than the predetermined threshold value, a normally operating system is inferred and the method is at least temporarily ended in step 207 without an adjustment of the injection.

If it is determined in step 203 that the deviation in the torque outputs is greater than the predetermined threshold value, the injection mass at least in one of the cylinders 102 to 105 is subsequently adapted in step 204. For example, the injection mass which is injected into the cylinder 102 per cylinder cycle is changed. The change is dependent on the determined difference between the torque outputs.

Figure 3:
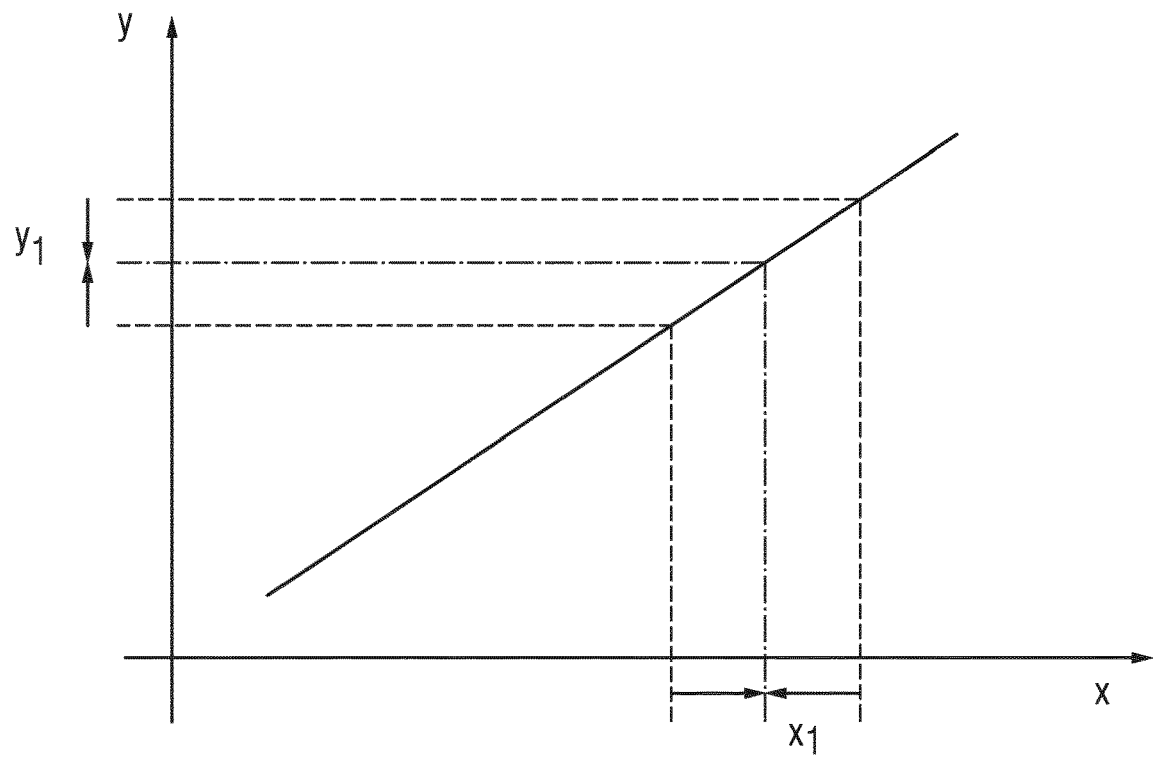
FIG. 3 shows a schematic illustration of the relationship between torque and injection mass incorporating teachings of the present disclosure.

As can be seen particularly from FIG. 3, the injection mass and the torque resulting therefrom are linearly related to one another. The injection mass is plotted on the X axis and the torque on the Y axis. If the torque of the cylinder 102 is intended to be reduced by the value Y1, the injection mass for the cylinder 102 is correspondingly reduced by the value X1. If the torque of the cylinder 102 is intended to be increased, the injection mass for the cylinder 102 is correspondingly increased.

If, however, the injection time is incorrect, it is possible that a change in the injection mass does not lead to a corresponding changed torque. For example, an increase in the injection mass does then not lead to an increase in the torque resulting therefrom. The injection time is particularly the time at which the torque-relevant injection of the injection mass of the fuel occurs per cylinder cycle. The injection time can also be referred to as injection position and/or injection phase.

Figure 4:
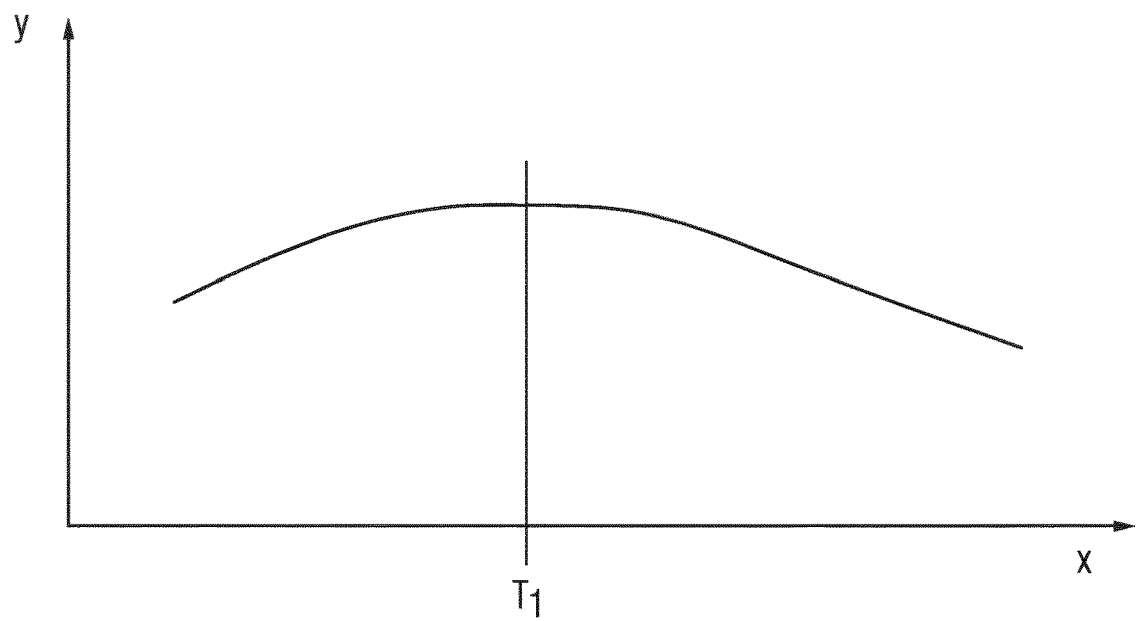
FIG. 4 shows a schematic illustration of a relationship between injection time and torque incorporating teachings of the present disclosure.

As can be seen particularly from FIG. 4 in which the injection time is plotted on the X axis and the torque is plotted on the Y axis, the output torque decreases if the injection time deviates from the optimum injection time T1. A correction of the injection time occurs, for example, iteratively while taking account of the exhaust gas temperature. If, for example, a change in the injection time in the advanced direction does not lead to the desired change in the output torque upon renewed adaptation of the injection mass, but to an increase in the exhaust gas temperature, it can be concluded that the injection time before the adjustment was too advanced. All further iteration steps should then occur in the retarded direction.

In order to take into account the effect of the injection time in the matching of the torque outputs, it is determined in step 205 whether the expected torque change results on account of the injection mass changed in step 204. The torque change is checked for plausibility with the injection mass change. If the torque output by the cylinder 102 corresponds to the change in the injection mass, that is to say if, for example, the condition as illustrated in FIG. 3 is satisfied, the method is started again with step 202 and repeated until the difference in the torque outputs of the cylinders 102 to 105 lies below the predetermined threshold value.

If it is determined in step 205 that the changed injection mass does not lead to an expected torque change, the injection mass change from step 205 is reversed in step 206. The injection mass to be injected is set to the original value at which it was before the step 204.

In step 206, the injection time of the injection in the cylinder 102 is then changed. For example, the injection time is advanced. In some embodiments, the injection time is retarded. The control process is repeated until a uniform torque is displayed on all cylinders 102 to 105 due to the adaptations of the injection mass and of the injection time. In particular, the method steps 202 to 206 are repeated until, in step 203, it is determined that the difference is less than the predetermined threshold value.

If, after a predetermined time period, no convergence of the method occurs, that is to say if it is not established within the predetermined time period that the difference is less than the predetermined threshold value, another defect in the system can be inferred. The different torque outputs are then not caused by different injection masses or an incorrect injection time. Such a defect can be, for example, an inaccuracy in the exhaust gas recirculation or in the compression.

In some embodiments, not only is the injection mass adapted in order to match the torque output of the cylinders 102 to 105, but in addition injection time is also adapted, if necessary. It is thus possible to avoid a defective trimming of the cylinder equalization. In particular, no further input variables are necessary for the method. A reliable plausibility check is possible, for example, without information on a cylinder pressure. Since, for example, the injection correction values can also be used by the device 110 for an assessment of the injection, misdiagnoses can be avoided. Thus, a reliable cylinder equalization in internal combustion engines with direct injection is possible. This leads to a reliable operation of the internal combustion engine 106.

REFERENCE SIGNS

100 System
101 Fuel distributor
102, 103, 104, 105 Cylinders
106 Internal combustion engine
107 Crankshaft
110 Device
201-207 Method steps
T1 Injection time

What is claimed is:

1. A method for operating an internal combustion engine having at least two cylinders, the method comprising:
    injecting a first amount of fuel into each of the at least two cylinders;
    determining a respective torque output of each of the at least two cylinders resulting from the injection of the first amount of fuel into each cylinder;
    determining a difference in the respective torque of each of the at least two cylinders;
    comparing the difference in the respective torque with a predetermined threshold value;
    if the determined difference exceeds the threshold value, injecting a second amount of fuel, different from the first amount of fuel for at least one of the at least two cylinders based at least in part on the determined difference;
    determining a further torque output of the at least one of the at least two cylinders resulting from the injection of the second amount of fuel;
    determining whether the further torque output corresponds to the second amount of fuel;
    if the further torque output lies outside a predetermined tolerance range for a corresponding injection mass, setting an injection mass to be injected to the first amount of fuel; and
    changing the injection time in at least the one of the at least two cylinders.

2. The method as claimed in claim 1, further comprising:
    determining a crankshaft acceleration of a crankshaft of the internal combustion engine resulting from an injection of fuel into the respective cylinder; and determining the respective torque output based at least in part on the respective crankshaft acceleration.

3. The method as claimed in claim 2, wherein determining the crankshaft acceleration includes monitoring a transmitter wheel sensor and a transmitter wheel coupled to the crankshaft.

4. The method as claimed in claim 2, wherein determining the crankshaft acceleration includes monitoring a running smoothness of the internal combustion engine.

5. The method as claimed in claim 2, wherein determining the crankshaft acceleration includes monitoring a change in rotational speed of the crankshaft.

6. The method as claimed in claim 1, further comprising repeating the method until a further determined difference in the torque outputs is less than the predetermined threshold value for the torque output.

7. The method as claimed in claim 6, further comprising determining another defect if, after a predetermined time interval, the further determined difference is not less than the predetermined threshold value for the torque output.

8. A device comprising:
a processor; and
a memory storing a set of instructions, the set of instructions, when loaded and executed by the processor, causing the processor to:

determine a respective torque output of each of at least two cylinders of an internal combustion engine resulting from a first amount of fuel injected into each of the at least two cylinders respective cylinder;
determine a difference in the respective torque generated by each of the at least two cylinders;
comparing the difference in the respective torque with a predetermined threshold value;
if the determined difference exceeds the threshold value, injecting a second amount of fuel different from the first amount of fuel for at least one of the at least two cylinders based at least in part on the determined difference;
determining a further torque output of the at least one of the at least two cylinders resulting from the injection of the second amount of fuel;
determining whether the further torque output corresponds to the second amount of fuel;
if the further torque output lies outside a predetermined tolerance range for a corresponding injection mass, setting an injection mass to be injected to the first amount of fuel; and
changing the injection time in at least one of the at least two cylinders.

\* \* \* \* \*